| United States Patent Office | 3,316,021 |
|---|---|
| | Patented Apr. 25, 1967 |

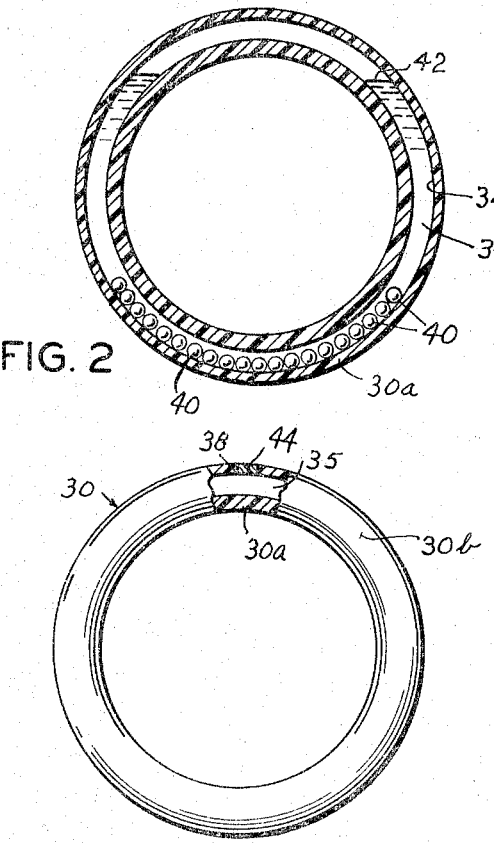
FIG. 2
FIG. 1
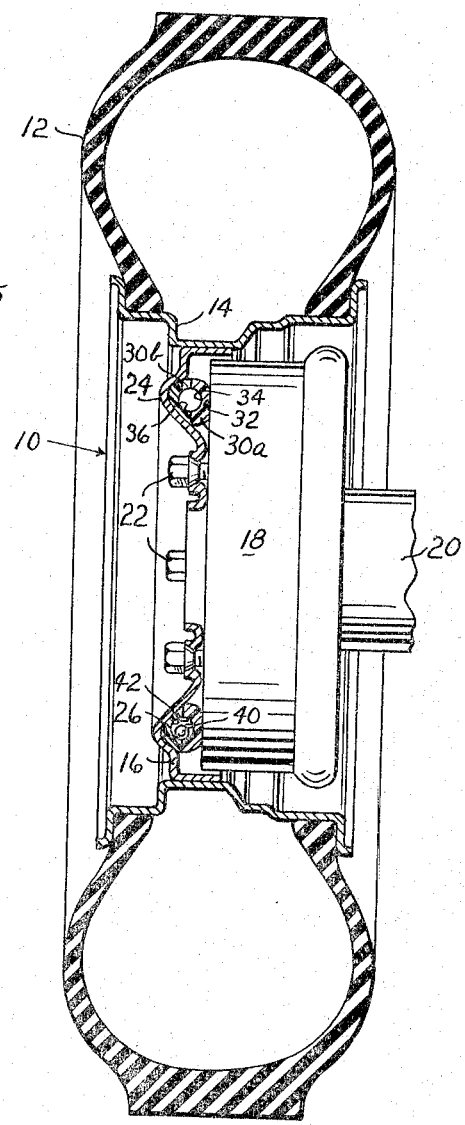
FIG. 3

3,316,021
WHEEL BALANCER
Virgil H. Salathiel, 1312 Slocum St.,
Dallas, Tex. 75207
Filed Jan. 4, 1965, Ser. No. 423,131
2 Claims. (Cl. 301—5)

The present invention relates to vehicles and more particularly to an automatic balancer for vehicle wheels.

The present invention is a continuation-in-part of an application filed by me in the United States Patent Office on Aug. 12, 1963, under Ser. No. 301,376 for Wheel Balancer, Patent Number 3,164,413.

This invention is an improvement over the above referred-to patent in that it positions the balancer more nearly in line with the toric axis of the vehicle wheel and tire.

Various means have been used to balance vehicle wheels. The more common type of wheel balancing means is static balancing by the use of lead weights which are clamped to the rim portion of the wheel and requires the service of experienced mechanics and special equipment. Such weights are frequently lost or misplaced when repairing or changing the tires. Therefore, it will be readily understood that a large percentage of vehicles are operated with unbalanced wheels which cause vibration of the vehicle, uneven wear of the tires, excessive wear of the bearings and steering mechanism and other parts of the vehicles.

The prior art reveals a number of attempts to achieve a dynamic balance for wheels or rotating bodies. The devices shown by the prior art feature the use of globular weights contained by an annulus, some of which are filled with fluid. Some of the reasons why the devices of the prior art are unsatisfactory are the weights are formed of relatively small soft material, such as lead shot, which tend to pile up in groups in the annulus or, being small, their movement is restricted or hampered by the fluid filling the remaining portion of the annulus. Such weights wear or become flattened and thus fail to respond to an out of balance condition of the wheel or body. When no fluid is used the movement of the weights, particularly when using weights of substantial size with respect to the size of the annulus, is too rapid and thus do not maintain a dynamic balance under variations of acceleration or deceleration.

It is, therefore, the principal object of this invention to provide a device which is adapted to be connected to a vehicle wheel to provide a dynamic balance of the wheel and compensate for tire distortion and out-of-roundness and mud lodged or caked on the wheel or gravel and the like picked up by the tire tread while traveling along a highway.

A similar object is to provide a wheel balancing device which supplements the balance of a static balanced wheel wherein conventional lead weights have been used to achieve the static balance.

Another object is the provision of a device of this class which may be easily attached to a vehicle wheel on the inwardly disposed side of the wheel adjacent the periphery of the brake drum.

Still another object is the provision of a wheel balancer featuring globular weights and a weight dampening fluid wherein the weights are automatically positioned to maintain vehicle wheels in a dynamic balanced condition by centrifugal force while the fluid dampener prevents sudden undesired shifting of the weights in response to a shock or force applied to the wheel or tire.

Still another object is to provide a wheel balancing device in which the balancing means is redistributed, after each stop of the vehicle, each time the vehicle reaches a certain velocity.

A further object is the provision of a device of this class which is not hampered in its operation by changing the position of the tire with respect to the wheel, as for example when repairing a flat tire.

Yet another object is to provide a wheel balancer which may be moved from one wheel to another of the same size.

The present invention accomplishes these and other objects by connecting a ring-like body having a hollow annular recess, containing a selected quantity of globular weights and fluid, to the inward side surface of a vehicle wheel.

Other objects will be apparent from the following description when taken in conjunction with the accompanying single sheet of drawings, wherein:

FIGURE 1 is an elevational view of a wheel balancer, partly in section;

FIGURE 2 is a vertical cross-sectional view through the balancer taken substantially along its toric axis; and, FIGURE 3 is a vertical cross-sectional view, partially in elevation, illustrating the relative position of the balancer when installed on a vehicle wheel connected with a brake drum.

Like characters of reference designate like parts in those figures of the drawings in which they occur.

In the drawings:

The reference numeral 10 indicates a vehicle wheel having a tire 12 mounted thereon. The wheel 10 includes a tire holding rim 14 which is connected to a web portion 16. One side of the web 16 is adapted to contiguously contact the outer surface of a brake drum 18 connected with a vehicle axle or housing 20. Adjacent its axis, the web 16 is provided with a plurality of circumferentially spaced apertures for receiving a like plurality of lug bolts 22 for holding the wheel in contact with the brake drum 18. The web is further provided with an annular bulge or reinforcing 24 extending arcuately outward away from the brake drum 18 forming an annular recess 26 in spaced relation with respect to the brake drum, the wheel flange 14 and row of lug bolts 22. It is within this recess 26 that I position my wheel balancer.

In carrying out the invention I provide an endless ring 30, preferably formed of opposing mating halves 30a and 30b, clearly shown in FIG. 3. The ring is shown formed of plastic material but any type of material may be used which meets the requirements hereinafter described.

The outer surface of the ring half 30a is formed to define arcuate outer surfaces merging with a straight or flat surface 32 which contacts the outer surface of the brake drum projecting toward the web 16. The ring section 30a is further characterized by an annular groove 34 substantially semicircular in cross section. The ring section 30b is formed with an arcuate outer surface which is nested and contiguously contacts the inner surface of the reinforcing rib 24 forming the recess 26. The inward or mating surface of the section 30b is similarly provided with an annular groove 36, semicircular in cross section and of equal size with respect to the groove 34, so that when the two ring sections 30a and 30b are placed in mating relation they form a hollow annular ring-like cavity 35. The two sections 30a and 30b are joined and bonded together by a suitable bonding agent, not shown. An aperture 38 is formed in the outer wall of the assembly ring 30 through which a quantity of steel balls 40 are placed in the cavity 35. The diametric size of the balls is preferably greater than one-half the cross section diameter of the cavity 35 so that the balls will not tend to pile up when the ring is in operation as herein described. The quantity of balls 40 used is such that they occupy, when in point contact relation with each other, approximately one-third the circumferential distance of the cavity 35. After inserting the balls 40, a quantity of special dampening fluid 42 is placed within the cavity 35. The quantity of fluid used, in combination with the area displaced by the balls 40, preferably fills the cavity ¾ full. The dampening fluid 42 used has specifications similar to automatic transmission fluid and is as follows: API specific gravity 33.0; pour point 43.5 at 60° F.; total carbon residue 0.001%; initial boiling point 275° F.; viscosity index 101.52 and kinematic viscosity 11.89 cs. at 100° F. and 2.89 cs. at 210° F. The viscosity of the fluid 42, in combination with the walls forming the cavity and size of the balls, retards the movement of the balls thus preventing any sudden weight shift by an impact of the tire on an object. It is essential that the cavity not be completely filled with the fluid for the reason that, when the cavity is full of the fluid, the movement of the balls is retarded by the viscosity of the fluid to such an extent that a dynamic balance of the wheel cannot easily be obtained. After installing the balls 40 and fluid 42, the aperture 38 is closed by a sealing plug 44.

Operation

In operation the assembled ring 30, containing the weights or balls 40 and filled approximately ¾ full of the dampening fluid 42, is placed within the recess formed by the rib 24 of a wheel web. The ring 30 is preferably secured to the surface forming the recess by a suitable bonding agent, not shown, so that the ring 30 will remain in place when the wheel is removed from the vehicle. The wheel 10 and tire 12 is preferably static balanced prior to the installation of the ring 30 as explained hereinabove.

When the vehicle is at rest, the balls 40 gravitate toward the downwardly disposed portion of the ring. Movement of the vehicle starts the balls moving partially retarded by the viscosity of the fluid, around the cavity 35 and at a velocity between 8 and 20 miles per hour, centrifugal force evenly distributes the fluid 42 along the outer wall surface defining the periphery of the cavity while a portion of the balls will automatically be distributed, by centrifugal force, along that portion of the periphery of the cavity which is diametrically opposite a heavy portion of the tire or wheel thus achieving a dynamic balance of the tire and wheel. This results in an air space evenly distributed around the cavity 35 opposite the position of the fluid 42 and an even distribution of the remaining balls 40. Each time the vehicle is stopped the balls gravitate toward the bottom of the tube to repeat the cycle when the vehicle is again put in motion.

Obviously the invention is susceptible to some change or alteration without defeating its practicability, and I therefore do not wish to be confined to the preferred embodiment shown in the drawings and described herein, further than I am limited by the scope of the appended claims.

I claim:
1. In a dynamic wheel balancing attachment the combination with a vehicle wheel adapted to be connected to a brake drum, said wheel having a rim and a tire mounted thereon, said wheel having a substantially central brake drum engaging web, said web having a reinforcing rib concentric with its axes and turned arcuately outward from the plane forming said brake drum engaging web and forming an annular recess on the inner surface of said web outwardly of the central brake drum engaging web, of: an endless ring comprising a pair of mating ring sections each having arcuate outer surfaces and opposite flat mating surface for joining said sections together, said ring sections each having an annular groove, semicircular in cross section, formed in its flat mating surface for forming an endless cavity having a uniform cross section throughout its entire periphery in any radial plane containing the ring axis, the external diameter of the ring being substantially maximum internal diameter of the annular recess, bonding material joining said endless ring to the web surface forming the annular recess; a quantity of steel balls disposed and freely movable within the cavity, the diameter of said steel balls being greater than one-half the cross section diameter of the cavity, said balls, when positioned in point contact with each other, occupying substantially one-third of the circumferential distance of the cavity; and a fluid of low voscosity, in combination with the balls, filling substantially three-quarters of the annulus of said cavity, the viscosity of said fluid and its incomplete filling of the cavity forming an air space along the periphery of said cavity during rotation of the ring and permitting movement of said balls and an even distribution of the fluid around the balls within the cavity providing a dampening effect against quick movement of said balls, whereby centrifugal force disperses said low viscosity fluid and said steel balls around said cavity in wheel and tire balancing position, said steel balls having a higher density than the fluid.

2. A dynamic wheel balancing attachment as defined in claim 1 wherein the fluid has the following approximate characteristics and specifications: API specific gravity 33.0, pour point 43.5 at 60° F.; and initial boiling point 275° F.

References Cited by the Examiner
UNITED STATES PATENTS

| | | |
|---|---|---|
| 331,450 | 12/1885 | Rothe. |
| 414,642 | 11/1889 | Herrick. |
| 1,314,005 | 8/1919 | Louden. |
| 2,687,918 | 8/1954 | Bell _____ 301—5 |
| 2,771,240 | 11/1956 | Gurin. |
| 3,006,690 | 10/1961 | Pierce _____ 301—5 |

FOREIGN PATENTS 832,048 4/1960 Great Britain.

MILTON BUCHLER, Primary Examiner.

RICHARD J. JOHNSON, Examiner.